US011904820B2

(12) United States Patent
Ganzel (10) Patent No.: US 11,904,820 B2
(45) Date of Patent: Feb. 20, 2024

(54) APPARATUS AND METHOD FOR CONTROL OF A HYDRAULIC BRAKE BY WIRE SYSTEM

(71) Applicant: ZF Active Safety US Inc, Livonia, MI (US)

(72) Inventor: Blaise J. Ganzel, Ann Arbor, MI (US)

(73) Assignee: ZF Active Safety US Inc., Livonia, MI (US)

(*) Notice: Subject to any disclaimer, the term of this patent is extended or adjusted under 35 U.S.C. 154(b) by 264 days.

(21) Appl. No.: 17/366,682

(22) Filed: Jul. 2, 2021

(65) Prior Publication Data

US 2023/0001902 A1    Jan. 5, 2023

(51) Int. Cl.
  *B60T 13/58*    (2006.01)
  *B60T 13/68*    (2006.01)
  (Continued)

(52) U.S. Cl.
  CPC .............. *B60T 13/58* (2013.01); *B60T 7/042* (2013.01); *B60T 13/148* (2013.01);
  (Continued)

(58) Field of Classification Search
  CPC . B60T 8/404; B60T 8/26; B60T 8/326; B60T 13/166; B60T 13/148; B60T 13/746; B60T 13/58; B60T 13/686; B60T 13/745; B60T 2220/04; B60T 2270/82; B60T 2270/402; B60T 2270/404
  (Continued)

(56) References Cited

U.S. PATENT DOCUMENTS

| | | | |
|---|---|---|---|
| 2002/0117891 A1* | 8/2002 | Harris ..................... | B60T 13/58 303/122.04 |
| 2020/0207320 A1* | 7/2020 | Plewnia .................. | B60T 13/58 |

(Continued)

FOREIGN PATENT DOCUMENTS

| | | |
|---|---|---|
| DE | 102014214375 A1 | 1/2016 |
| DE | 102017201982 A1 | 8/2018 |

(Continued)

OTHER PUBLICATIONS

German Search Report for corresponding German Application Serial No. 10 2022 206 557.3, dated Mar. 2, 2023, pp. 1-10.

*Primary Examiner* — Robert A. Siconolfi
*Assistant Examiner* — San M Aung
(74) *Attorney, Agent, or Firm* — Robert James Harwood (57) ABSTRACT

A brake system for selectively actuating at least one of a pair of front wheel brakes and a pair of rear wheel brakes of a vehicle, one of which is hydraulically actuated and the other of which is electrically actuated, includes a reservoir. First and second integrated control units are in fluid communication with the reservoir and respective ones of the hydraulically actuated wheel brakes. The first and second integrated control units have first and second power transmission units connected to first and second electronic control unit, respectively. Each electronic control unit is configured to control a corresponding power transmission unit and a selected one of the electrically actuated wheel brakes on a contralateral side of the vehicle from the selected one of the hydraulically actuated wheel brakes which is actuated by the power transmission unit.

14 Claims, 4 Drawing Sheets

(51) Int. Cl.
  *B60T 7/04*   (2006.01)
  *B60T 13/14*  (2006.01)
  *B60T 17/22*  (2006.01)
  *B60T 13/74*  (2006.01)

(52) U.S. Cl.
  CPC .......... *B60T 13/686* (2013.01); *B60T 13/746* (2013.01); *B60T 17/221* (2013.01); *B60T 2220/04* (2013.01); *B60T 2270/402* (2013.01); *B60T 2270/404* (2013.01); *B60T 2270/82* (2013.01)

(58) Field of Classification Search
  USPC .......................................................... 303/3
  See application file for complete search history.

(56) References Cited

U.S. PATENT DOCUMENTS

2021/0053540 A1* 2/2021 Besier .................. B60T 13/58
2021/0129817 A1* 5/2021 Michels ................ B60T 8/1755
2021/0146900 A1* 5/2021 Einig ................... B60T 13/662

FOREIGN PATENT DOCUMENTS

| | | |
|---|---|---|
| DE | 102018205811 A1 | 10/2018 |
| DE | 102018002989 A1 | 10/2019 |
| DE | 102018002990 A1 | 10/2019 |
| DE | 102018003001 A1 | 10/2019 |
| DE | 102022206557 A1 | 1/2023 |
| DE | 102022206560 A1 | 1/2023 |
| DE | 102022208249 A1 | 2/2023 |
| EP | 3950445 A1 | 2/2022 |

\* cited by examiner

APPARATUS AND METHOD FOR CONTROL OF A HYDRAULIC BRAKE BY WIRE SYSTEM

TECHNICAL FIELD

This disclosure relates to an apparatus and method for control of a hydraulic brake by wire system and, more particularly, to a method and apparatus of providing for selectively actuating at least one of a pair of front wheel brakes and a pair of rear wheel brakes of a vehicle in a brake by wire system.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal).

SUMMARY

In an aspect, a brake system for selectively actuating at least one of a pair of front wheel brakes and a pair of rear wheel brakes of a vehicle is disclosed. A selected pair of the front wheel brakes and the rear wheel brakes is hydraulically actuated and an other pair of the front wheel brakes and the rear wheel brakes is electrically actuated. A reservoir is provided. A pair of brake motors selectively electrically actuate respective left and right wheel brakes of the pair of electrically actuated wheel brakes. A first integrated control unit is in fluid communication with the reservoir and a selected one of the hydraulically actuated wheel brakes. The first integrated control unit has a first power transmission unit connected to a first electronic control unit. The first power transmission unit is configured to selectively generate pressurized hydraulic fluid for actuating the selected one of the hydraulically actuated wheel brakes during a braking event. The first electronic control unit is configured to control the first power transmission unit and a selected one of the electrically actuated wheel brakes, on a contralateral side of the vehicle from the selected one of the hydraulically actuated wheel brakes which is actuated by the first power transmission unit. A second integrated control unit is in fluid communication with the reservoir and an other one of the hydraulically actuated wheel brakes. The second integrated control unit has a second power transmission unit connected to a second electronic control unit. The second power transmission unit is configured to selectively generate pressurized hydraulic fluid for actuating the other one of the hydraulically actuated wheel brakes during a braking event. The second electronic control unit is configured to control the second power transmission unit and an other one of the electrically actuated wheel brakes, on a contralateral side of the vehicle from the other one of the hydraulically actuated wheel brakes which is actuated by the second power transmission unit.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
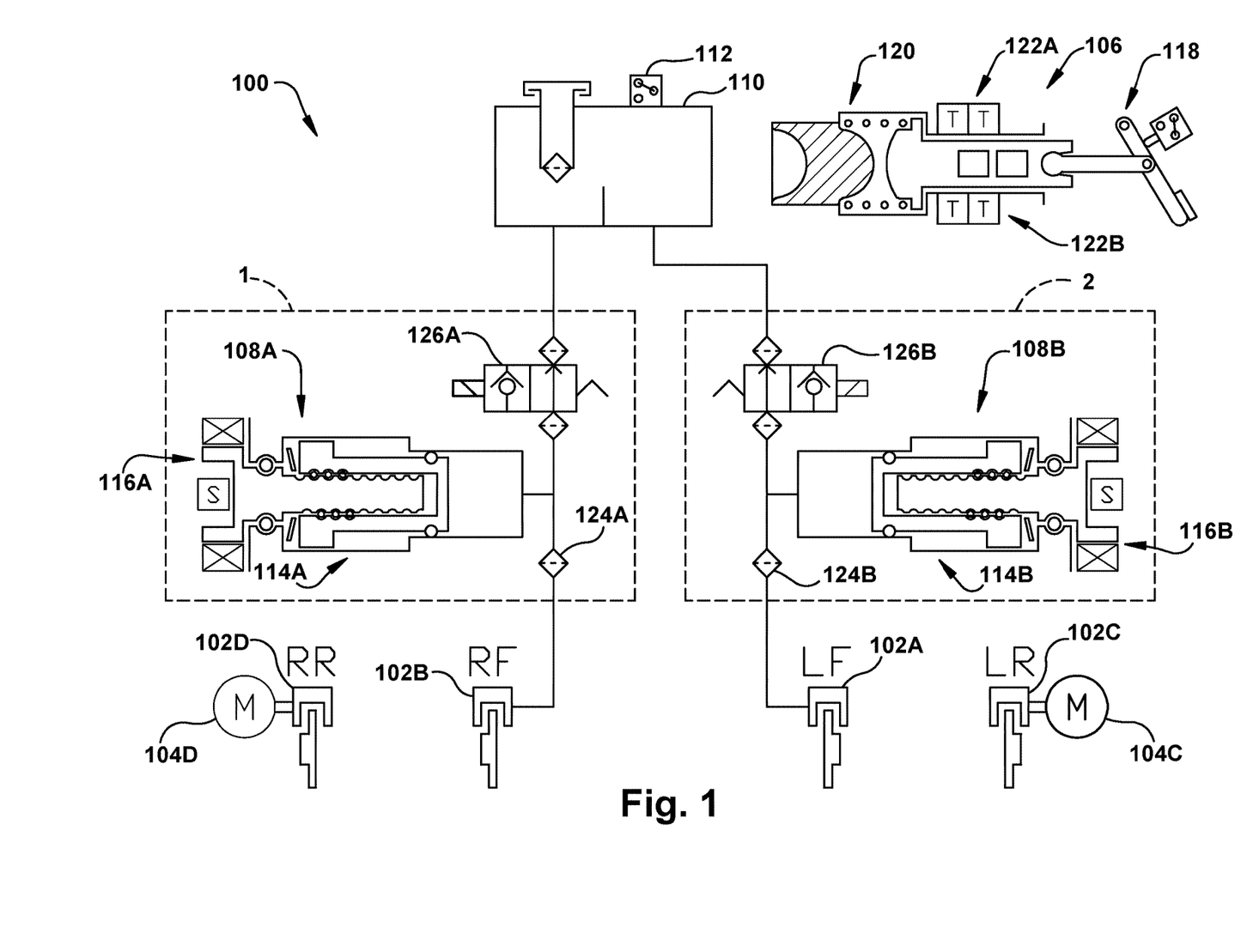
FIG. 1 is a schematic hydraulic diagram of a brake system according to an aspect of the present invention, in a first configuration.
Figure 2:
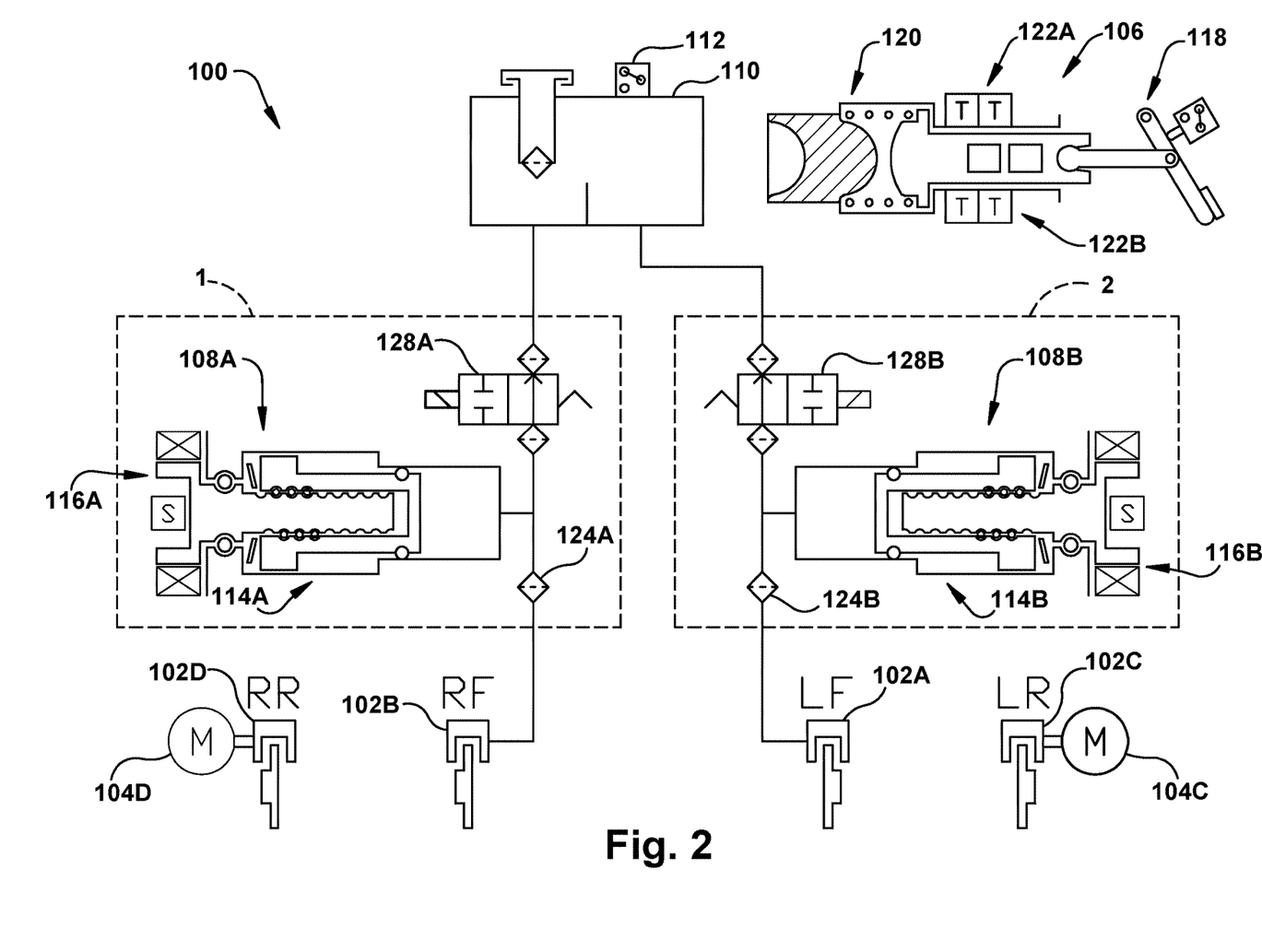
FIG. 2 is a schematic hydraulic diagram of the brake system of FIG. 1, in a second configuration.

FIGS. 1-2 depict brake systems 100 for actuating a pair of front wheel brakes and a pair of rear wheel brakes of a vehicle, in first and second configurations, respectively. The brake systems 100 are shown here as hydraulic brake by wire systems in which electronically controlled fluid pressure is utilized to apply braking forces for at least a portion of the brake systems 100. The brake systems 100 may suitably be used on a ground vehicle, such as an automotive vehicle having four wheels with a wheel brake associated with each wheel. Furthermore, the brake systems 100 can be provided with other braking functions such as anti-lock braking (ABS) and other slip control features to effectively brake the vehicle. Components of the brake systems 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake systems 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel. The wheel brakes 102A, 102B, 102C, and 102D can be associated with any combination of front and rear wheels of the vehicle in which the selected brake system 100 is installed. For example, the brake systems 100 may be configured as a diagonal split system, as shown, such that a first pressure circuit (indicated by dashed line "1" in FIGS. 1-2) is associated with providing fluid to one or both of the right wheel brakes 102B and 102D, and these two brakes are electrically actuated in kind, as noted below. A second pressure circuit (indicated by dashed line "2" in FIGS. 1-2) may be associated with providing fluid to one or both of the left wheel brakes 102A and 102C; again, with electrical actuation from the same source, as further discussed below.

As shown in FIGS. 1-2, the front wheel brakes 102A and 102B are hydraulically operated, and the rear wheel brakes 102C and 102D may be electrically operated, such as by including the pair of rear wheel motors 104C and 104D for selectively electrically actuating respective left and right rear wheel parking and/or service brakes on the rear wheels, as shown in FIGS. 1-2. However, it is contemplated that either selected pair of the front wheel brakes and the rear wheel brakes is hydraulic actuated and the other pair of the front wheel brakes and the rear wheel brakes is electrically actuated, as may be configured by one of ordinary skill in the art for any desired use environment of the brake systems 100.

It is contemplated that the wheel brakes 102A, 102B, 102C, and 102D could each be powered electrically and/or hydraulically—for example, the front wheel brakes 102B and 102D could be electrically powered and the rear wheel brakes 102A and 102C could be hydraulically powered, and/or at least one of the wheel brakes 102A, 102B, 102C, and 102D could be powered electrically during certain phases of operation and hydraulically during other phases of operation, of the same brake system 100, in addition to the potential provision of electrically or hydraulically operated parking brakes to any of the front and/or rear wheels, as desired.

In the example shown in the Figures, the hydraulically operated wheel brake 102A may be associated with a left front wheel of the vehicle in which the brake system 100 is installed, and the hydraulically operated wheel brake 102B may be associated with the right front wheel. The electrically operated wheel brake 102C may be associated with the left rear wheel, and the electrically operated wheel brake 102D may be associated with the right rear wheel.

The brake systems 100 may include a brake pedal unit, indicated generally at 106, at least one integrated control unit (two shown in FIGS. 1-2 and indicated generally here at 108A and 108B, respectively), and a fluid reservoir 110. The reservoir 110 stores and holds hydraulic fluid for the brake system 100. The fluid within the reservoir 110 is preferably held at or about atmospheric pressure, but the fluid may be stored at other pressures if desired. The reservoir 110 is shown schematically having two tanks or sections with fluid conduit lines connected thereto. The sections can be separated by several interior walls within the reservoir 110 and are provided to prevent complete drainage of the reservoir 110 in case one of the sections is depleted due to a leakage via one of the two lines connected to the reservoir 110. Alternatively, the reservoir 110 may include multiple separate housings. The reservoir 110 may include at least one fluid level sensor 112 for detecting the fluid level of one or more of the sections of the reservoir 110.

Each of the first and second integrated control units 108A, 108B includes a corresponding first or second power transmission unit 114A, 114B serving as a source of pressure to provide a desired pressure level to the corresponding hydraulically operated ones of the wheel brakes 102A, 102B, 102C, and 102D during a typical or normal non-failure brake apply. Each of the first and second integrated control units 108A, 108B is in fluid communication with the reservoir 110 and with a selected one of the hydraulically actuated wheel brakes (here, the left front wheel brake 102A or the right front wheel brake 102B, respectively).

After a brake apply, fluid from the hydraulically operated ones of the wheel brakes 102A, 102B, 102C, and 102D may be returned to the corresponding first or second power transmission unit 114A, 114B and/or diverted to the reservoir 110. At least one of the first and second power transmission units 114A, 114B is a single acting plunger unit which is configured to selectively generate pressurized hydraulic fluid for actuating a corresponding at least one hydraulically actuated wheel brake 102, as will be discussed further below with reference to FIGS. 3-4. It is also contemplated that configurations (not shown) of the brake systems 100 could include hydraulic control of all four wheels, or of the rear wheels instead of the front wheels (which would then be electrically controlled/actuated). One of ordinary skill in the art would be readily able to provide such an arrangement for a desired use environment, following aspects of the present invention.

Regardless of specific configuration, though, each of the first and second integrated control units 108A, 108B is configured for selectively providing pressurized hydraulic fluid for actuating at least a selected hydraulically actuated one of the front or rear wheel brakes 102A, 102B, 102C, and/or 102D during a braking event.

The brake systems 100 also include at least one electronic control unit ("ECU") 116. Here, each of the first and second integrated control units 108A and 108B includes an ECU 116A and 116B connected to the corresponding first or second power transmission unit 114A, 114B. Each ECU 116A, 116B may include microprocessors and other electrical circuitry, and may be connected to either a dedicated or a shared (with the other ECU) power supply. Each ECU 116A, 116B receives various signals, processes signals, and controls the operation of various electrical components of the brake systems 100 in response to the received signals. Each ECU 116A, 116B can be connected to various sensors such as the reservoir fluid level sensor 112, pressure sensors, travel sensors, switches, wheel speed sensors, and steering angle sensors. Each ECU 116A, 116B may also be connected to an external module (not shown) for receiving information related to yaw rate, lateral acceleration, longitudinal acceleration of the vehicle, or other characteristics of vehicle operation for any reason, such as, but not limited to, controlling the brake systems 100 during vehicle braking, stability operation, or other modes of operation. Additionally, each ECU 116A, 116B may be connected to the instrument cluster for collecting and supplying information related to warning indicators such as an ABS warning light, a brake fluid level warning light, and a traction control/vehicle stability control indicator light.

The first and second electronic control units 116A, 116B are provided, in the configurations of the brake systems 100 shown in FIGS. 1-2, for controlling at least one of the first and second power transmission units 116A, 116B and at least one of the pair of electrically actuated rear brake motors 104C, 104D (or other electrically actuated wheel brakes of the brake systems 100). In the example configuration shown in FIGS. 1-2, each ECU 116A, 116B is configured to control a corresponding power transmission unit 114A, 114B (connected to a hydraulically actuated one of the wheel brakes, shown and described here as left front wheel brake 102A and right front wheel brake 102B), as well as to control a selected one of the electrically actuated wheel brakes which is on the contralateral side of the vehicle as the hydraulically actuated wheel brake which is actuated by that same ECU 116A, 116B. In this manner, if one ECU 116A, 116B were to fail, then only one brake on each left/right side of the vehicle would be lost. Stated differently, and with reference to the example configurations of FIGS. 1-2, the first ECU 116A of the first integrated control unit 108A controls the first power transmission unit 114A, the hydraulically actuated right front wheel brake 102B, and the electrically actuated left rear wheel brake 102C (via control of the rear wheel motor 104C). Likewise, the second ECU 116B of the second integrated control unit 108A controls the second power transmission unit 114B, the hydraulically actuated left front wheel brake 102A, and the electrically actuated right rear wheel brake 102D (via control of the rear wheel motor 104D), in the example embodiment of FIGS. 1-2.

At least a selected one of the first and second power transmission units 114A, 114B may be integrated into a common housing with a corresponding one of the first and second ECUs 116A, 116B, as described in more detail with reference to FIGS. 3-4, below.

As shown schematically in FIGS. 1-2, the brake pedal unit 106 includes a brake pedal 118 connected thereto and actuated by the driver of the vehicle as the driver presses on the brake pedal 118 (moving the brake pedal 118 toward the left, in the orientation of schematic FIGS. 1-2) to indicate a desired braking command. A hydraulic and/or mechanical pedal simulator 120, of any suitable type, may be provided to selectively resist pressure of the brake pedal 118 as desired and thereby provide an expected brake pedal 118 "feel" to the driver. A brake sensor or position switch 122 may be electrically connected to at least one ECU 116 to determine a position of the brake pedal 118 and responsively produce a braking signal indicating a depression of the brake pedal 120 and thus corresponding to the desired braking command.

As shown in the example brake systems 100 of FIGS. 1-2, first and second brake sensors 122A and 122B are electrically connected to the first and second ECUs 116A, 116B, respectively, for redundancy in operation. The braking signal is transmitted by each of the first and second brake sensors 122A and 122B to at least one of the first and second ECUs 116A and 116B (each ECU 116 could receive signals from both brake sensors 122, for redundancy). The first and/or second ECUs 116A and 116B controls a respective one of the first and second power transmission units 114A, 114B and/or a respective one of the electronically actuated wheel brakes (here, rear wheel brakes 102C and 102D) responsive to the braking signal from at least one of the first and second brake sensors 122A and 122B. The braking signal may be transmitted from at least one of the first and second brake sensors 122A and 122B to at least one of the first and second ECUs 116A and 116B in any desired wired and/or wireless manner.

At least one filter 124 may be provided in any desired position(s) within the brake systems 100. For example, and as shown in FIGS. 1-2, each of the first and second integrated control units 108A and 108B may have a corresponding filter 124A, 124B interposed hydraulically between the integrated control unit 108A, 108B and a corresponding hydraulically actuated at least one wheel brake (here, left and right front wheel brakes 102A and 102B).

It is contemplated that certain configurations of the brake systems 100 may include first and second venting valves 126A and 1268, as shown in FIG. 1, corresponding to first and second integrated control units 108A, 108B, respectively. The first and second venting valves 126A, 126B, when present, may be located hydraulically between the reservoir 110 and a corresponding first or second integrated control unit 108A, 108B. The first and second venting valves 126A, 126B may be venting valves, and may be controlled by a same ECU 116A, 116B as controls the corresponding power transmission unit 114A, 1148. When present, the first and second venting valves 126A, 126B may be provided to assist venting one or more of the wheel brakes 102 to reservoir under predetermined conditions, such as when the wheel brake(s) 102 are not being actuated. If the venting valves 126A, 126B are not present, or do not include a check valve function, then the power transmission unit 114A, 114B may be able to create a predetermined level of negative pressure ("vacuum") at one or more of the wheel brakes 102. When negative pressure is applied to a wheel brake 102, retraction of the brake pads could result, which may be helpful in selectively reducing brake drag and/or measuring brake pad wear, as desired.

With reference now to FIG. 2, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

In the arrangement of the brake system 100 shown in FIG. 2, the brake system 100 is substantially similar to that of FIG. 1. However, in the brake system 100 depicted in FIG. 2, the first and second venting valves 126A, 126B are omitted. Instead, first and second two-way valves 128A and 128B, respectively, are located hydraulically between the reservoir 110 and a corresponding first or second integrated control unit 108A, 108B. The first and second two-way valves 128A, 128B, when present, may be used to selectively hydraulically isolate the corresponding first or second power transmission unit 114A, 114B (and its respective hydraulically operated wheel brake(s) 102A, 102B) from the reservoir 110, e.g., for use in pad wear detection/diagnostics as mentioned above.

Figure 3:
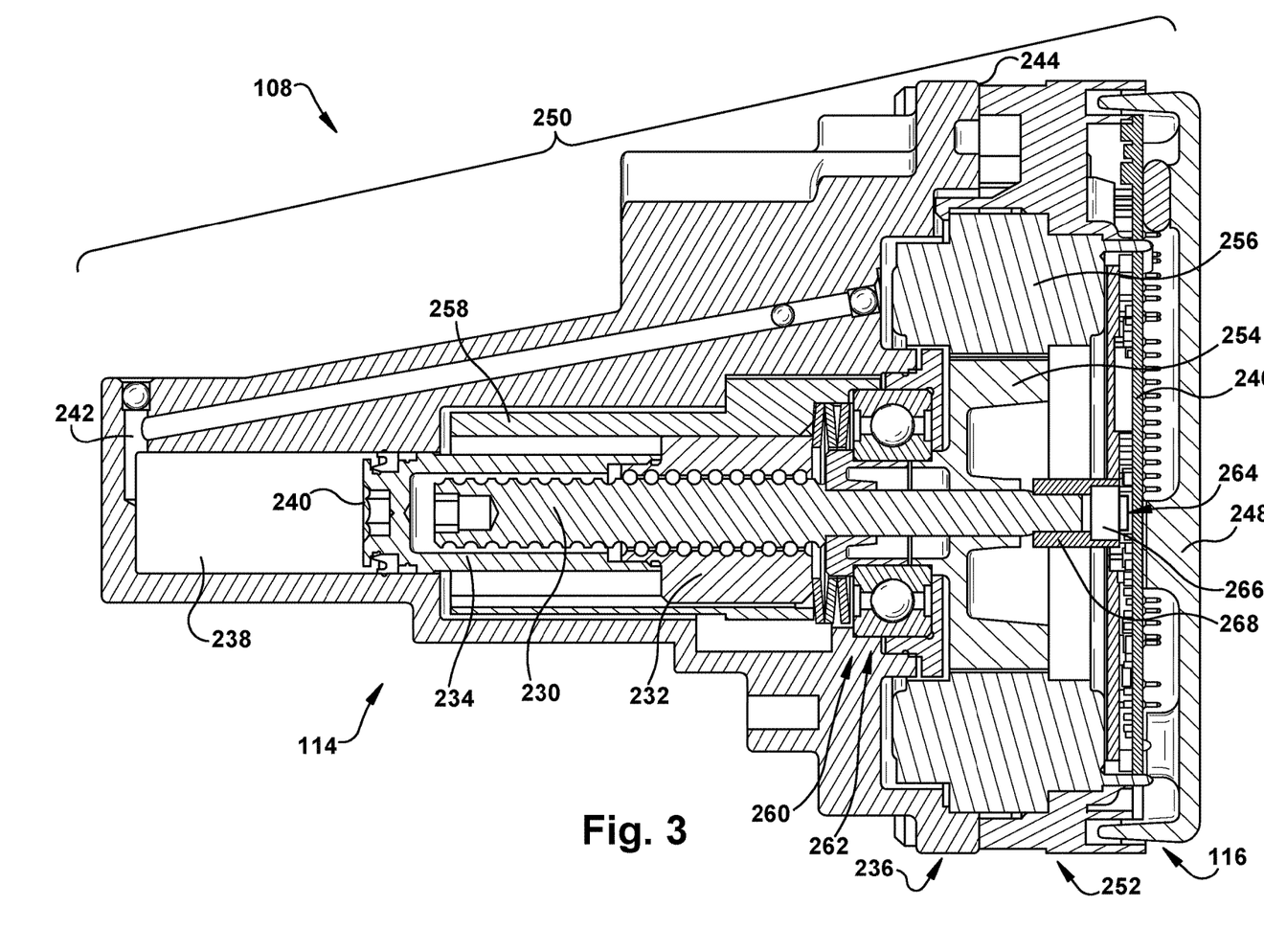
FIG. 3 is a schematic partial cross-sectional view of a component suitable for use in a brake system according to any aspect of the present invention.
Figure 4:
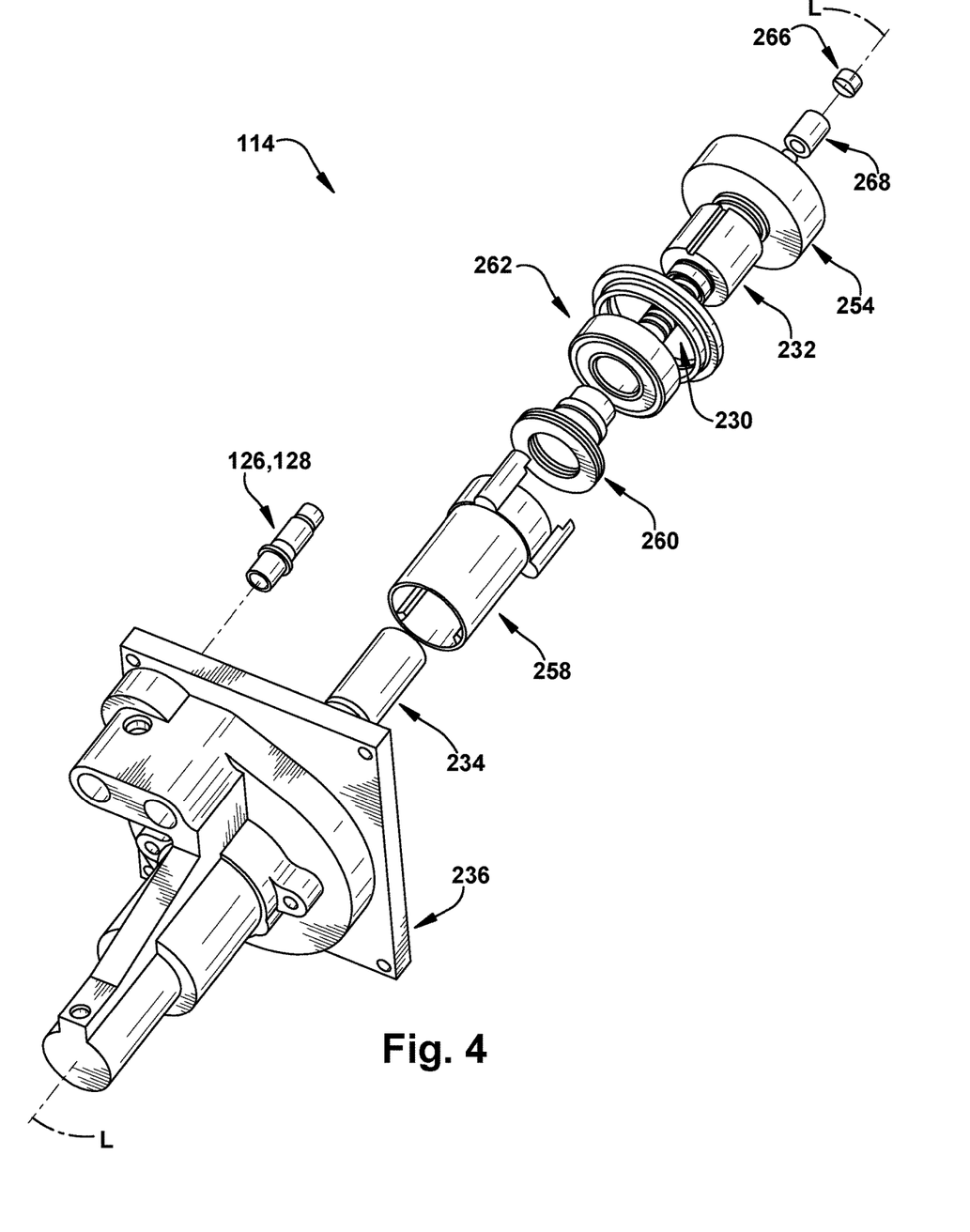
FIG. 4 is a partial exploded perspective view of the component of FIG. 3.

Turning now to FIGS. 3-4, an example power transmission unit 114—which may be either or both of first and second power transmission units 114A, 114B—is shown in detail, as can be used with any one of the brake systems 100 of FIGS. 1-2. It is contemplated that one or both of first and second power transmission units 114A, 114B could instead be of the rack-and-pinion type disclosed in co-pending U.S. patent application Ser. No. 17/366,715, filed concurrently herewith and titled "Apparatus and Method for Selectively Actuating Wheel Brakes of a Hydraulic Brake System", incorporated herein by reference in its entirety. However, for simplicity of description, the below description will reference the power transmission unit 114 of FIGS. 3-4 as being used for both of the first and second power transmission units 114A and 114B of FIGS. 1-2; the "A" and "B" suffixes differentiating the first and second ones of each component are omitted from FIGS. 3-4.

The example power transmission unit 114 of FIGS. 3-4 is of the single acting plunger assembly type and includes a ball screw 230 and a ball nut 232 selectively driven by the ball screw 230. A plunger piston 234 is operatively coupled to the ball nut 232. A housing 236 at least partially encloses the plunger piston 234, the ball screw 230, and the ball nut 232.

A plunger chamber 238 is at least partially defined by the housing 236 and a face of the plunger piston 240. The plunger piston 234 is configured to reciprocate within the plunger chamber 238 under influence of the ball screw/ball nut 230/232 combination. An output channel 242 is in fluid communication between the plunger chamber 238 and at least one of the reservoir 110 and the hydraulically actuated wheel brake(s) 102 corresponding with the power transmission unit 114. The plunger chamber 238 is configured to contain hydraulic fluid and is selectively pressurized by reciprocal motion of the plunger piston 234 with respect to the housing 236. The venting valve and/or two-way valve 126 or 128 corresponding to the power transmission unit 114 can be used to direct pressurized fluid from the plunger chamber 238 as desired, under control of the ECU 116 corresponding to the power transmission unit 114.

As depicted in FIGS. 3-4, the housing 236 may be a first housing 236 including an open rim 244. The open rim 244 is spaced apart from the plunger chamber 238. Each ECU 116 includes a circuit board 246 and a second housing 248 (here, the second housing 248 is of a two-part construction, with a ringlike first section [optionally made of plastic] attached to a substantially planar ECU cover [optionally made of metal] extending at least partially parallel to the ECU). The second housing 248 is configured for selective attachment to the first housing 236 to collectively form an integrated control unit housing ("ICU housing") 250.

The power transmission unit 114 includes an electric motor 252 for selectively driving the ball screw 230 of the single acting plunger assembly type power transmission unit 114 to responsively reciprocate the plunger piston 234 within the plunger chamber 238. The integrated control unit housing 250 encloses the circuit board 246, the electric motor 252, the ball screw 230, the ball nut 232, and the plunger piston 234, as shown in FIG. 3.

The electric motor 252 includes a motor rotor 254 operatively coupled to the ball screw 230 and a motor stator 256 mounted on the second housing 248. Torque developed by the motor stator 256 is resisted by the housing 236, to hold the motor stater 256 rotationally steady with respect to the ICU housing 250, while the motor rotor 254 rotates along with the ball screw 230. When the power transmission unit 114 is referenced herein as being controlled and/or powered by an ECU 116, what is meant is that the electric motor 252 is controlled and/or powered to selectively rotate the motor rotor 254 and thereby reciprocate the plunger piston 234 within the plunger chamber 238 to pressurize hydraulic fluid in the plunger chamber 238.

In order to facilitate reliable and efficient operation of the power transmission unit 114, a number of additional components, shown in exploded view in FIG. 4, may be provided. For example, an anti-rotation sleeve 258 at least partially prevents rotation of the ball nut 232 and constrains the ball nut 232 to reciprocal motion along longitudinal axis (shown as axis L in FIG. 4). A washer spring and spindle sleeve assembly 260 may be provided to help center and bias the ball screw 230 and the ball nut 232 as desired within the first housing 236. A bearing 262, when present, can help to reduce friction between components of the power transmission unit 114.

At least one of the power transmission unit 114 and the electronic control unit 116 may include a position sensor (shown generally at 264) producing a signal indicative of a rotational and/or longitudinal position of the ball screw 230 and/or the ball nut 232 with respect to the first housing 236, the second housing 248, or the ICU housing 250 in general. The position sensor 264, when present, may sense rotational movement of the ball screw 230 and responsively calculate longitudinal motion of the ball nut 232 and/or the plunger piston 234. It is also contemplated that the position sensor 264 (which again, could be located in any desired position on or adjacent the power transmission unit 114) could directly sense longitudinal motion of the ball nut 232 and/or the plunger piston 234.

As shown by way of example in FIG. 3, the position sensor 264, which is again indicative of at least one of a rotational and a longitudinal position of the ball screw 230 with respect to the first housing 236, the second housing 248, or the ICU housing 250 may be mounted on the circuit board 246. For example, the position sensor 264 may be of a Hall effect type, which senses a position (here, a rotational position) of a magnet 266 carried by the ball screw 230. As shown in FIGS. 3-4, the magnet 266 may be mounted by a magnet sleeve 268 on an end of the ball screw 230 adjacent the circuit board 246. It is contemplated, though, that the position sensor 264, when present, may be of any suitable type which is configured to sense, directly or indirectly, a position of at least one of the ball screw 230, ball nut 232, and plunger piston 234 such as, but not limited to, a Hall effect sensor, an inductive sensor, and/or an optical sensor.

The position sensor 264, regardless of type, generates a position signal responsive to a sensed location of the plunger piston 234 with respect to the plunger chamber 238. The ECU 116 receives the position signal from the position sensor 264 and responsively controls fluid flow between the plunger chamber 238 and at least one of an associated wheel brake 102 and the reservoir 110. Additionally or instead, the ECU 116 may calculate at least one of a pressure and a volume of hydraulic fluid within the plunger chamber 238 responsive to the sensed position signal. The ECU 116 could also or instead sense motor current and responsively extrapolate the pressure within the plunger chamber 238, and/or the pressure could be sensed, directly or indirectly, with a pressure sensor (not shown) at any desired location in the brake system 100.

In the arrangement of the brake system 100 shown in the Figures, the brake pedal unit 106 may be remotely located from other structures of the brake system 100, to provide a "brake by wire" configuration. Here, the brake pedal unit 106 is of a deceleration signal transmitter type, which provides the braking signal to the ECUs 116A, 116B in a wired or wireless manner exclusively. No manual push-through function is contemplated by the brake system 100 shown in the Figures and described herein. It is contemplated that the brake pedal 118 and related structures may simply be a manually controlled brake arrangement using hand controls or another non-pedal input or may be entirely omitted from the brake system 100 shown in FIGS. 1-2, for a truly autonomous brake arrangement.

Using an integrated control unit 108 such as, but not limited to, that shown in FIGS. 3-4, the brake systems 100 shown in FIGS. 1-2 can be provided in a hydraulic brake by wire system. Through use of a wired or wireless connection between the brake pedal unit 106, when present, and at least one ECU 116A, 116B, the first and second power transmission units 114A, 114B may be controlled in order to implement hydraulic braking to one or more wheel brakes 102A, 102B, 102C, and 102D in a desired manner. In the brake systems 100 of FIGS. 1-2, the front wheel brakes 102A, 102B are each hydraulically powered and controlled by a different one of the first and second integrated control units 108 A, 108 B, and the rear brakes 102C, 102D of the vehicle are controlled in a contralateral manner, via the ECU 116A, 116B which controls the front brake on the other side of the vehicle. Through use of these redundant systems, repeatable and predictable performance of the brake systems 100 of FIGS. 1-2 can be provided to a vehicle.

It is contemplated that components, arrangements, or any other aspects of the brake systems 100 shown in the Figures and described herein could also or instead be used in the brake systems shown and depicted in co-pending patent applications U.S. patent application Ser. No. 17/366,715, filed concurrently herewith and titled "Apparatus and Method for Selectively Actuating Wheel Brakes of a Hydraulic Brake System", and/or U.S. patent application Ser. No. 17/366,623, filed concurrently herewith and titled "Apparatus and Method for Redundant Control of a Hydraulic Brake System"—both of which are hereby incorporated by reference in their entirety for all purposes—and/or components, arrangements, or any other aspects of the brake systems shown and described in these two copending applications could be used in the brake systems 100 shown in the Figures and described herein.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

What is claimed is:

1. A brake system for selectively actuating at least one of a pair of front wheel brakes and a pair of rear wheel brakes of a vehicle, a selected pair of the front wheel brakes and the rear wheel brakes being hydraulically actuated and an other pair of the front wheel brakes and the rear wheel brakes being electrically actuated, the system comprising:
    a reservoir;
    a pair of brake motors for selectively electrically actuating respective left and right wheel brakes of the pair of electrically actuated wheel brakes;
    a first integrated control unit, in fluid communication with the reservoir and a selected one of the hydraulically actuated wheel brakes, the first integrated control unit having a first power transmission unit connected to a first electronic control unit, the first power transmission unit being configured to selectively generate pressurized hydraulic fluid for actuating the selected one of the hydraulically actuated wheel brakes during a braking event, the first electronic control unit being configured to control the first power transmission unit and a selected one of the electrically actuated wheel brakes, on a contralateral side of the vehicle from the selected one of the hydraulically actuated wheel brakes which is actuated by the first power transmission unit; and a second integrated control unit, in fluid communication with the reservoir and an other one of the hydraulically actuated wheel brakes, the second integrated control unit having a second power transmission unit connected to a second electronic control unit, the second power transmission unit being configured to selectively generate pressurized hydraulic fluid for actuating the other one of the hydraulically actuated wheel brakes during a braking event, the second electronic control unit being configured to control the second power transmission unit and an other one of the electrically actuated wheel brakes, on a contralateral side of the vehicle from the other one of the hydraulically actuated wheel brakes which is actuated by the second power transmission unit, wherein the first and second electronic control units operate at the same time to control at least one of hydraulically actuating and electrically actuating the wheel brakes.

2. The brake system of claim 1, including a first venting valve and a second venting valve, each of the first and second venting valves being located hydraulically between the reservoir and a respective first or second integrated control unit, the first and second venting valves being configured to vent at least one wheel brake to the reservoir when the at least one wheel brake is in a nonactuated condition.

3. The brake system of claim 1, including a first two-way valve and a second two-way valve, each of the first and second two-way valves being located hydraulically between the reservoir and a respective first or second integrated control unit.

4. The brake system of claim 1, wherein at least one of the first and second power transmission units includes a single acting plunger unit configured to selectively generate the pressurized hydraulic fluid for actuating a corresponding hydraulically actuated wheel brake.

5. The brake system of claim 1, wherein a selected one of the first and second power transmission units is integrated into a common housing with a corresponding one of the first and second electronic control units.

6. The brake system of claim 1, including a brake pedal connected to a brake pedal unit and selectively actuated by a driver of the vehicle to indicate a desired braking command, the brake pedal unit having a brake sensor for determining a position of the brake pedal and responsively producing a braking signal corresponding to the desired braking command, the braking signal being transmitted to at least one of the first and second electronic control units, and the at least one of the first and second electronic control units controlling a respective power transmission unit and a respective one of the electrically actuated wheel brakes responsive to the braking signal.

7. The brake system of claim 6, wherein the braking signal is wirelessly transmitted to the at least one of the first and second electronic control units.

8. The brake system of claim 1, wherein each power transmission unit includes:

a single acting plunger assembly including a ball screw, a ball nut selectively driven by the ball screw, a plunger piston operatively coupled to the ball nut, a housing at least partially enclosing the plunger piston, the ball screw, and the ball nut, a plunger chamber at least partially defined by the housing and a face of the plunger piston, and an output channel in fluid communication between the plunger chamber and at least one of the reservoir and a hydraulically actuated wheel brake corresponding to the power transmission unit, the plunger chamber being configured to contain hydraulic fluid and selectively pressurized by reciprocal motion of the plunger piston with respect to the housing; and an electric motor for selectively driving the ball screw of the single acting plunger assembly to responsively reciprocate the plunger piston within the plunger chamber.

9. The brake system of claim 8, wherein the housing is a first housing including an open rim spaced apart from the plunger chamber, and each electronic control unit includes a circuit board and a second housing, the second housing being configured for selective attachment to the first housing to collectively form an integrated control unit housing, the integrated control unit housing enclosing the circuit board, the electric motor, the ball screw, the ball nut, and the plunger piston.

10. The brake system of claim 9, wherein the electric motor includes a motor rotor operatively coupled to the ball screw and a motor stator mounted on the second housing, wherein torque developed by the motor stator is resisted by at least a portion of the integrated control unit housing.

11. The brake system of claim 8, wherein at least one of the power transmission unit and the electronic control unit includes a position sensor indicative of a position of the ball screw with respect to the housing.

12. The brake system of claim 9, wherein a position sensor, indicative of a position of the ball screw with respect to the housing, is mounted on the circuit board.

13. The brake system of claim 12, wherein the position sensor is of a Hall effect type and senses a position of a magnet carried by the ball screw.

14. The brake system of claim 11, wherein the position sensor generates a position signal responsive to a sensed location of the plunger piston with respect to the plunger chamber, and the electronic control unit receives the position signal from the position sensor and responsively controls fluid flow between the plunger chamber and at least one of an associated wheel brake and the reservoir.

\* \* \* \* \*